United States Patent [19]

Clendenen

[11] 4,090,966

[45] May 23, 1978

[54] SEDIMENT COLLECTION AND REMOVAL SYSTEM FOR RECTANGULAR SEDIMENTATION BASIN

[76] Inventor: Frank B. Clendenen, 1545 Grass Valley Hwy., Apt. No. 41, Auburn, Calif. 95603

[21] Appl. No.: 807,825

[22] Filed: Jun. 20, 1977

[51] Int. Cl.² .............................................. B01D 21/18
[52] U.S. Cl. ..................................... 210/143; 210/527
[58] Field of Search ................. 210/143, 523, 525–531

[56] References Cited

U.S. PATENT DOCUMENTS

| | | | |
|---|---|---|---|
| 1,918,742 | 7/1933 | Elrod | 210/525 |
| 1,953,100 | 4/1934 | Blaisdell | 210/526 |
| 2,052,676 | 9/1936 | Tark | 210/530 |
| 2,067,277 | 1/1937 | Miick | 210/525 |
| 2,779,471 | 1/1957 | Knapp | 210/527 X |
| 3,890,289 | 6/1975 | Johnson | 210/523 X |

*Primary Examiner*—William A. Cuchlinski, Jr.

*Attorney, Agent, or Firm*—Lothrop & West

[57] ABSTRACT

A scraper body is slid along the bottom of a rectangular sedimentation basin from one end to the other in such a manner that a scraper blade carried by the scraper body engages the bottom of the basin during the sediment collection and removal pass and piles up the sediment in front of the scraper body. During this pass, a suction assembly mounted on the scraper body continuously removes the sediment piled up by the scraper blade. At the end of the sediment collecting and removal pass, the scraper blade engages and rides up a riser ramp to an elevated position where the scraper blade remains elevated by magnets or spring clips during the return pass of the scraper body. At the end of the return pass, the scraper blade is moved out of holding engagement with the magnets or spring clips by a blade lowering ramp which urges the blade downwardly into contact with the basin bottom in preparation for another sediment collection and removal pass.

17 Claims, 13 Drawing Figures

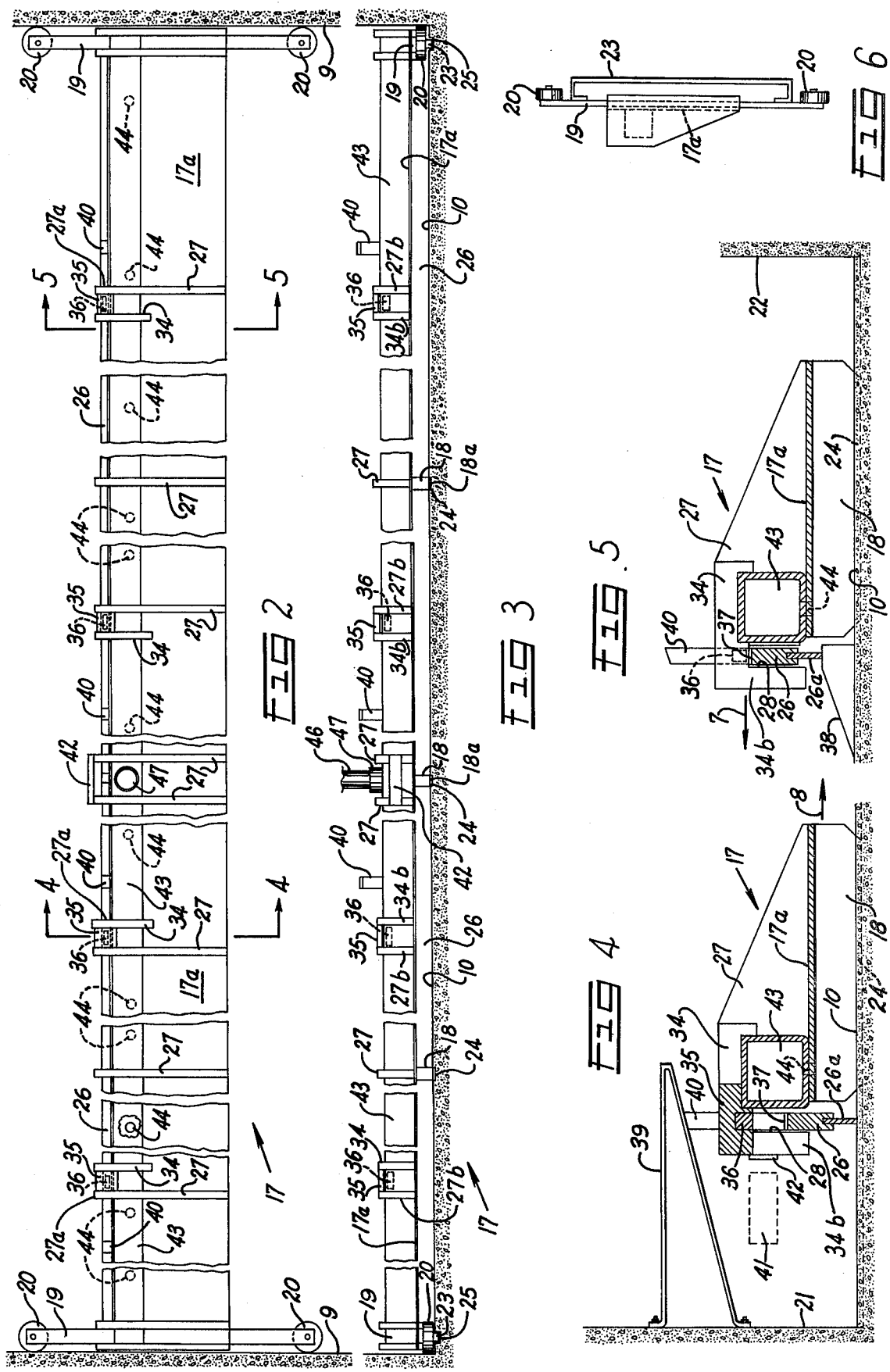

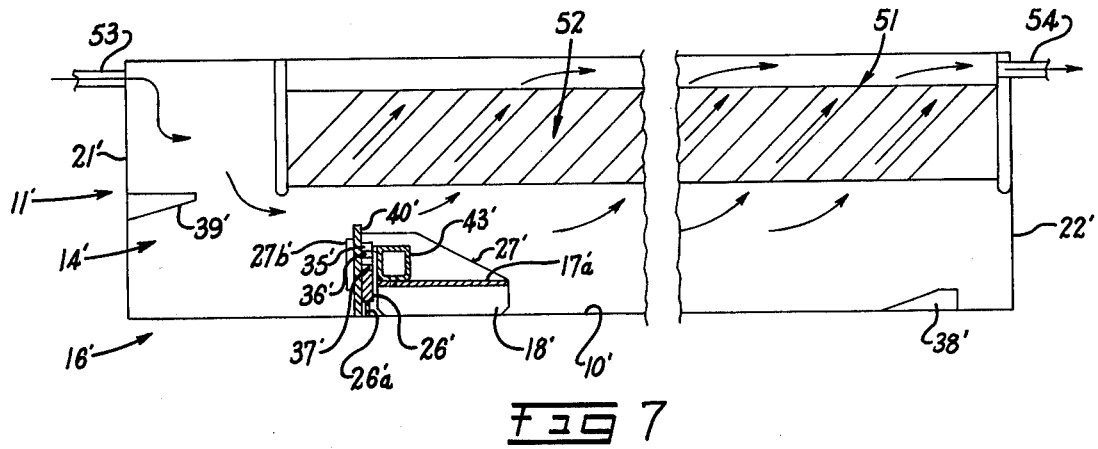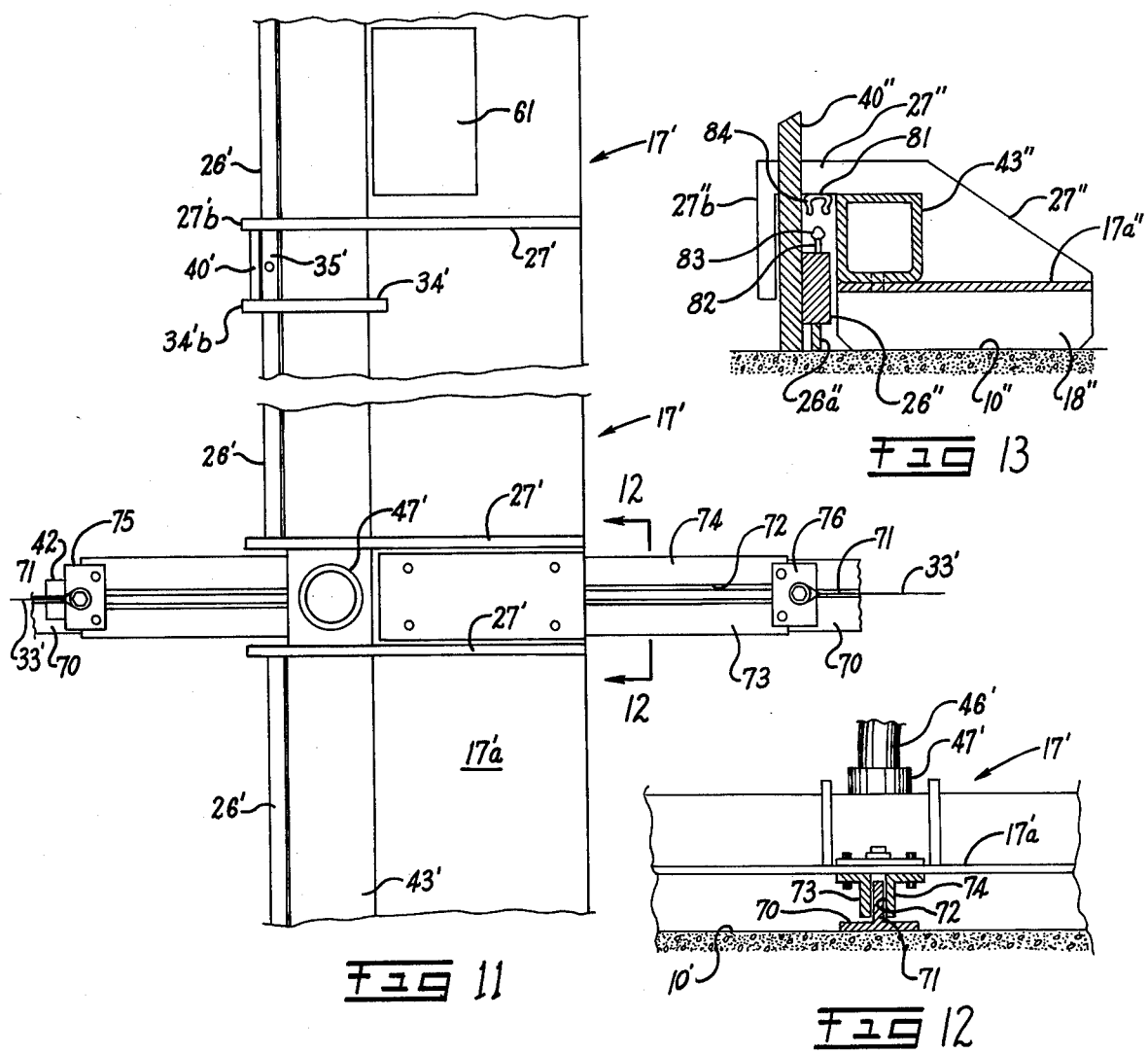

SEDIMENT COLLECTION AND REMOVAL SYSTEM FOR RECTANGULAR SEDIMENTATION BASIN

BACKGROUND OF THE INVENTION

Scraper assemblies which are pulled along the bottoms of sedimentation or sewage basins to push accumulated sediment into troughs or the like for expeditious removal are generally known in the art. It is also known to provide suction assemblies continuously to remove the sediment piled up in front of advancing scraper blades. A system of the latter type is disclosed in U.S. Pat. No. 2,052,676 in which the scraper blade and suction assembly revolve in a continuous circular path about the central axis of a round settling tank. As will be appreciated, in a round tank, the scraper blade can maintain engagement with the bottom of the tank, or basin, at all times.

On the other hand, in a sediment removal system for a rectangular basin, in which the scraper is reciprocated between the ends of the basin, it is desirable to maintain the scraper blade in engagement with basin bottom only during movement in one direction, namely, during the sediment collecting pass. The system must therefore be provided with means for elevating the scraper blade above the basin bottom during the return pass of the blade.

Just such a system is disclosed in U.S. Pat. No. 1,918,742 in which horizontal rails having pivoting sections are provided along the sides of the basin in order to engage and elevate the scraper blade above the bottom of the basin during the return pass. Although this system is operable, it is relatively costly since rails must be provided along the entire length of the basin.

Still other installations utilize an overhead shuttle railway from which is suspended a sediment collector which travels to and fro on the basin floor. The disadvantage of this type of system is that if tube settlers are used, one or more interruptions, such as slots or spaces, must be provided in the tube settlers throughout the entire length of the basin to accommodate the travel of the collector-supporting member.

In short, there remains considerable room for improvement in the art.

SUMMARY OF THE INVENTION

The present invention relates generally to an improved rectangular sedimentation basin sediment collection and removal system and, more particularly, to simplified means for maintaining a scraper blade in an elevated or retracted position during a return pass of the scraper blade.

It is an object of the invention to provide a sediment collection and removal system for a rectangular sedimentation basin which is reliable, relatively inexpensive, has but a minimum of moving parts to get out of order and effects continuous and efficient sediment removal during the collection pass of the scraper blade.

It is another object of the invention to provide a sediment collection and removal system which can be used to advantage in conjunction with tube settler modules without the necessity of modifying the module installation.

It is still another object of the invention to provide a generally improved sediment collection and removal system.

Other objects, together with the foregoing, are attained in the embodiment described in the following description and illustrated in the accompanying drawings.

BRIEF DESCRIPTION OF THE DRAWINGS

FIG. 2 is a fragmentary top plan view to a slightly enlarged scale of a scraper and suction assembly of one of the sediment collection and removal systems;

FIG. 3 is a front elevational view of the assembly shown in FIG. 2 with the floor of the basin shown in section;

FIG. 4 is a sectional view, to a considerably enlarged scale, taken on the line 4—4 of FIG. 2 through one of the magnets;

FIG. 5 is a sectional view to the same scale as FIG. 4 but taken on the line 5—5 in FIG. 2 adjacent one of the riser ramps;

FIG. 6 is an elevational view showing the anti-rotation beam and end skid construction as seen from the right-hand side wall in FIG. 2;

FIG. 7 is a fragmentary longitudinal schematic view to a greatly reduced scale showing a first modified form of the sediment collection and removal system of the present invention combined with an array of conventional tube settlers;

FIG. 11 is a fragmentary top plan view, to an enlarged scale, of the FIG. 7 form of assembly;

FIG. 12 is a sectional view, taken on the line 12—12 in FIG. 11; and,

FIG. 13 is a fregmentary sectional view, to an enlarged scale, of a second modification with the scraper blade and mounting plate in the lowered position of the blade, as in FIG. 7, but using spring clips in lieu of magnets to hold the blade in elevated position.

DETAILED DESCRIPTION OF THE PREFERRED EMBODIMENTS

While the rectangular sedimentation basin sediment collection and removal system of the invention is susceptible of numerous physical embodiments, depending upon the environment and requirements of use, the herein shown and described preferred embodiment has been made, tested and used, and has performed in an eminently satisfactory manner.

Figure 1:
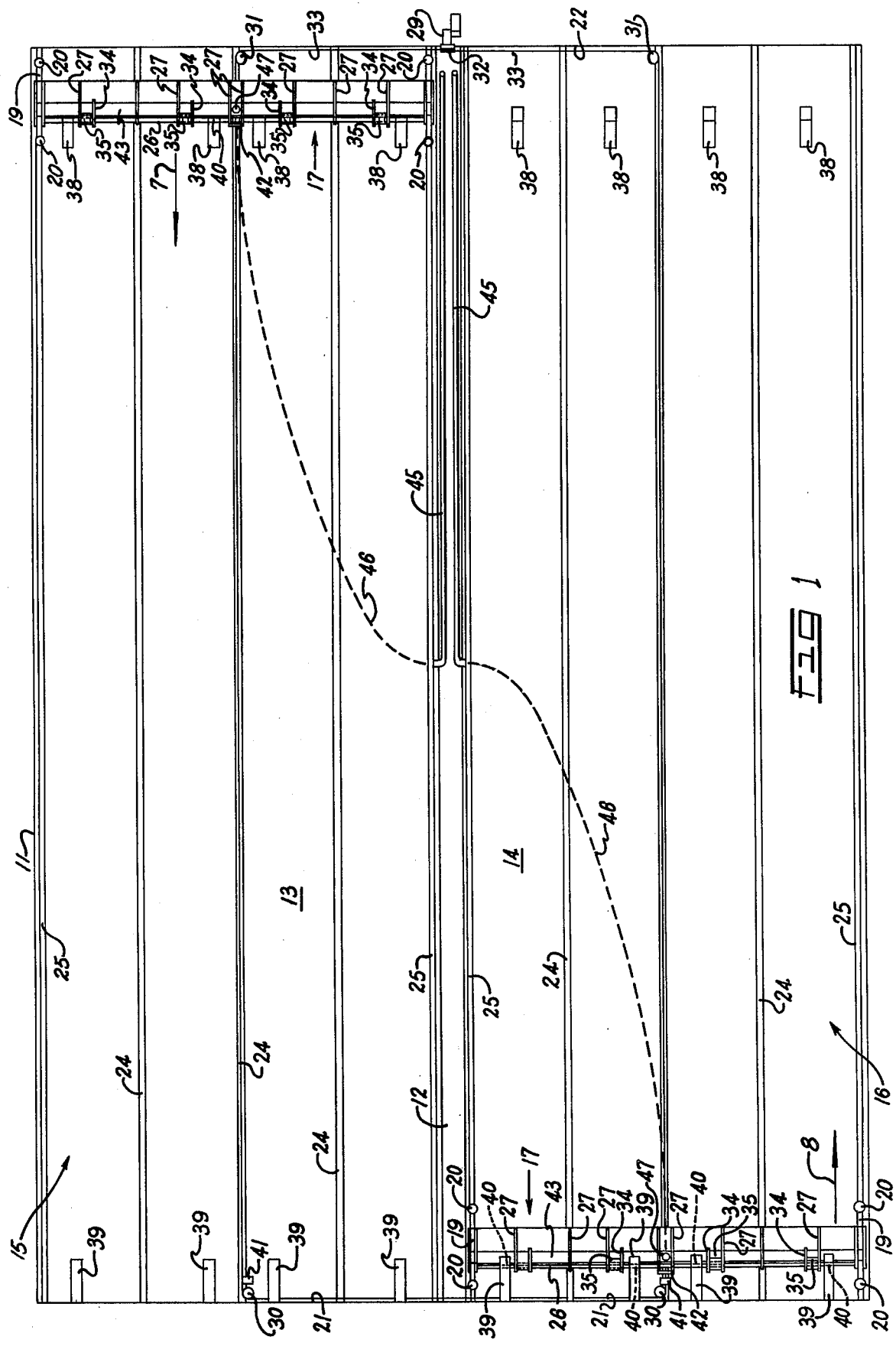
FIG. 1 is a top plan view, partially in schematic form, of a double rectangular sedimentation basin provided with two interconnected sediment collection and removal systems embodying one form of the invention.
Figure 8:
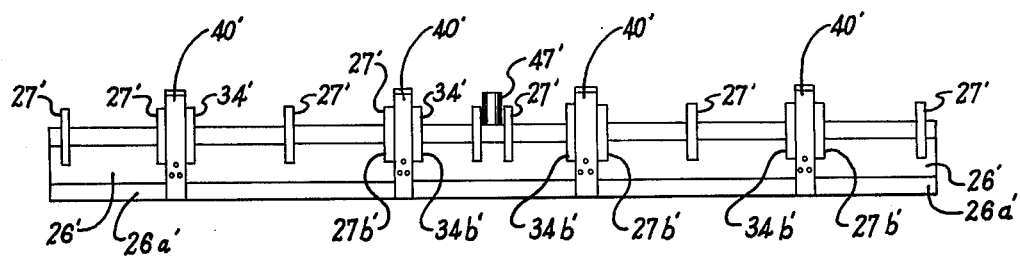
FIG. 8 is a front elevational view of the scraper blade and body assembly in the first modified form of system shown in FIG. 7.
Figure 9:
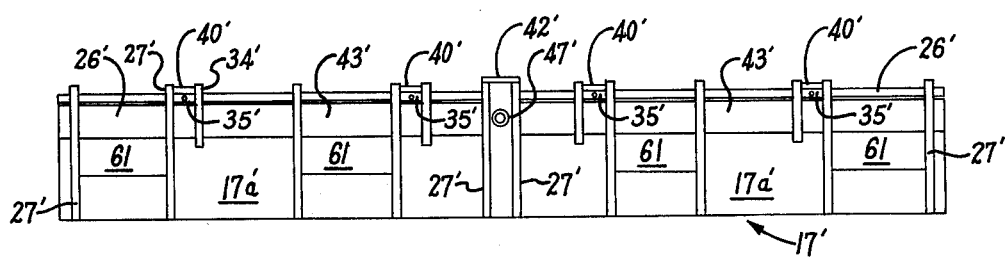
FIG. 9 is a top plan view of the FIG. 7 form of scraper assembly.
Figure 10:
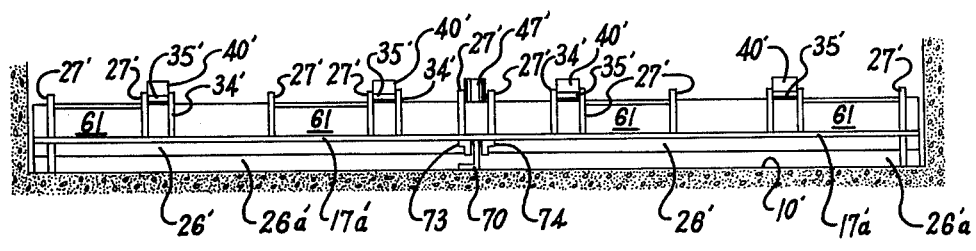
FIG. 10 is a rear elevational view of the FIG. 7 form of scraper assembly.

As can be seen most clearly in FIG. 1 of the drawings, a rectangular sedimentation basin 11 is conveniently provided with a central longitudinal partition 12 dividing the basin 11 into two rectangular channels 13 and 14. A first sediment collection and removal system 15 embodying the present invention is provided in the elongated channel 13 and a second sediment collection and removal system 16 is provided in the elongated channel 14. Since the systems 15 and 16 are substantially identical, the same reference numerals are used to designate the component elements of both systems.

As shown in greater detail in FIGS. 2-5, each of the systems 15 and 16 comprises a scraper body, or hood, generally designated by the reference numeral 17, transversely spanning each of the respective channels 13 and 14, the hood including a transversely elongated substantially horizontal plate 17a, termed a hood plate. In order to space the hood 17 above the channel bottom 10 for sliding movement thereon, central support skids 18, each including a strip of anti-friction material 18a on the bottom surface, project downwardly from the lower surface of each hood plate 17a. Antirotation beams 19 are provided at the opposite ends of each hood 17, the beams 19 carrying rollers 20 at their extremities. The antirotation beams 19 maintain the transverse hood 17 parallel to opposite ends 21 and 22 of the basin 11 through rolling engagement of the rollers 20 with the longitudinal side walls 9 of the channels 13 and 14. End skids 23 are preferably mounted on the bottoms of the antirotation beams 19 to support the ends of the hood 17.

In order further to eliminate horizontal rotation of the hood 17 about a vertical axis, and thereby obviate any tendency of the hood to jamb as it moves to and fro in the channel, longitudinal depressions 24, or grooves, may be formed in the bottom 10 of the basin 11 in order slidingly and guidingly to receive the central skids 18 in addition to similar grooves 25 to receive the end skids 23.

As an alternative construction, only one longitudinal depression 24, or groove, located in the center of the channel bottom 10, could be used, in which case only one skid 18, located midway between the ends of the hood 17 would be provided.

As is further shown in FIGS. 4 and 5, a vertical scraper blade 26 is mounted on each hood 17 for vertical movement between a lower, or scraping, position, in which a hard rubber insert 26a in the bottom of the blade is in scraping engagement with the bottom 10 of the basin 11, as shown in FIG. 4, and an elevated, or retracted, position, as shown in FIG. 5.

A plurality of fore and aft oriented scraper support brackets 27 is fixed to the hood plate 17a, each including an extension 27a projecting forwardly beyond the front edge of the hood plate 17a and a depending arm 27b defining a vertical slot 28 in which the scraper blade 26 is vertically slidable.

The scraper blades 26 of both of the systems 15 and 16 are mounted on the sides of the respective hoods 17 facing the left-hand end 21 of the basin 11, i.e. the end toward which the scraper moves on the return pass indicated by the arrow 7 in FIGS. 1 and 5. Thus, when the scraper assembly is moving in the sediment collecting direction indicated by the arrow 8 in FIGS. 1 and 4, the sediment scraped from the bottom of the basin piles up in front of the scraper blade 26 under the hood 17 for continuous removal, as will subsequently be explained in detail.

In order to propel the scraper assemblies to and fro along the channels 13 and 14, an electric drive motor 29 with a conventional gear reducer connected thereto is mounted at the center of the right-hand end 22 of the basin 11, as viewed in FIG. 1, and pairs of guide pulleys 30 and 31 are provided at the respective ends 21 and 22 of the basin 11 where the central axes of the longitudinal channels 13 and 14 intersect the ends 21 and 22. A drive pulley 32 is fixed to the shaft of the drive unit 29, and a wire cable 33 trained around the drive pulley 32 extends to the guide pulleys 30 and 31 thence to suitable connections on the central portions of the respective hoods 17. When the drive unit 29 is energized in a direction causing the cable 33 to move in an upward direction, as viewed in FIG. 1, the hood 17 and scraper blade 26 of the upper system 15 is moved leftwardly in a return pass indicated by the arrow 7; and concurrently, the hood 17 and scraper blade 26 of the lower system 16 is moved in the right hand direction 8 in a sediment collection and removal pass.

The scraper blades 26 are constructed so as to engage the bottom 10 of the basin 11 during the sediment collection and removal pass 8 and thus push accumulated sediment forwardly for removal. In the particular arrangement of the systems 15 and 16, as illustrated in FIGS. 1, 4 and 5, the upper system 15 is prepared to execute a return pass 7 with the scraper blade 26 in the upper or retracted position whereas the lower system 16 is prepared simultaneously to execute a sediment collection and removal pass 8 with the scraper blade 26 in the down or scraping position. Upon reaching the ends of the channels, the actions are reversed. This equalizes the load on the motor 29, cable and pulleys and enables one motor to operate two systems, thereby effecting economies. Reversal of motion is effected by a pair of proximity switches (see FIG. 4) suitably mounted adjacent the left-hand end of the basin near the pulleys 30, the proximity switches being actuated by the approach of bodies 42 mounted on the left-hand or leading end of the scraper blade assembly.

In accordance with a novel feature of the present invention, structure is provided which automatically moves the scraper blades 26 between the scraping and retracted positions at the correct time in the cycle.

Inclusive of the scraper blade actuating structure is a plurality of fore and aft magnet support brackets 34 mounted on the hood 17 adjacent and parallel to a respective one of the scraper support brackets 27. The magnet support brackets include a forwardly projecting portion 34a and a depending portion 34b which serve in conjunction with the depending arms 27b to define the vertical slot 28 in which the scraper blade 26 is vertically slidable. Magnet mounting plates 35 span the respective adjacent parallel scraper support brackets 27 and magnet support brackets 34.

Magnets 36 are mounted on the undersides of the plates 35 and are superposed over the scraper blades 26. As best viewed in FIG. 4, ferromagnetic plates 37 are provided on the upper surface of the scraper blades 26 and face the magnets 36 in such a manner that when the scraper blade 26 is moved upwardly so that the ferromagnetic plates 37 engage the magnets 36, the scraper blade 26 is held in the elevated or retracted position by the force of the magnets 36.

The structure used to raise the scraper blades 26 from their lower, or scraping, positions to their upper, or retracted, positions at the end of a collection and removal pass is shown in FIGS. 1 and 5 as comprising wedge shaped riser ramps 38 provided at the right-hand ends of the channels 13 and 14. As one of the hoods 17, and the scraper blade 26 retained thereby, approach the right-hand end 22 of the basin 11 at the conclusion of a sediment collection and removal pass 8, the scraper blade 26 rides up the riser ramps 38 so that the ferromagnetic plates 37 engage the magnets 36 which then hold the scraper blade 26 in upward, or retracted, position for the return pass 7. If desired, the positions of the magnets 36 and the ferromagnetic plates 37 may be reversed.

To lower the scraper blade 26 from the upper retracted position to the lower scraping position at the end of a return pass 7, magnet release ramps 39, or lowering ramps, are provided at the left-hand end 21 of the basin 11, as best viewed in FIGS. 1 and 4. The lowering ramps 39 are disposed above the hoods 17 and are engageable with beveled risers 40 or actuating bars, extending upwardly from the scraper blades 26. As the hood 17 and scraper blade 26 approaches the left-hand end 21 of the basin 11, the beveled tops of the risers 40 engage with and ride down the sloping surface of the lowering ramps 39, thereby separating and breaking the magnetic engagement of the plates 37 with the magnets 36 and allowing the scraper blade 26 to drop downwardly by gravity into scraping engagement with the bottom of the basin 11, ready for the subsequent collection and removal pass 8.

Also shown in FIGS. 1 and 4 is the drive reversing mechanism including a pair of limit switches 41 of the proximity type, mounted at the left-hand end 21 of the channels 13 and 14. Registering switch actuators 42, or proximity targets, mounted on the left-hand end of the hoods 17 engage and close the limit switches 41 at the leftward limit of travel of the hoods 17. The limit switches 41 are electrically connected in a conventional manner to reverse the direction of rotation of the motor 29 when closed. Thus, the hoods 17 are caused to reciprocate between the ends 21 and 22 of the basin 11 in the desired manner.

In one embodiment of the invention, the magnets 36 are permanent magnets. They may, however, be electromagnets or electrically controlled solenoids. In a case in which the magnets 36 are electromagnets, the lowering ramps 39 may be omitted and their function provided by the limit switches 41 in combination with the electromagnets. The limit switches 41, in this case, in addition to controlling the motor 29, control the electromagnets in such a manner that the electromagnets are kept energized during the return pass 7 with the scraper blade in elevated position and are then de-energized at the end of the return pass through actuation of the respective limit switch 41 of effect lowering of the scraper blade 26, the scraper blade descending by gravity into scraping position.

Although the scraper blades 26 may simply serve to collect and push accumulated sediment to the right-hand end 22 of the basin 11, where troughs (not shown) may be provided to facilitate removal, a suction manifold 43 is preferably mounted on each hood 17 forward of the scraper blade 26 in the sediment collection removal direction 8, as appears in FIGS. 1 and 4. The bottom wall of the suction manifold 43 is provided with a plurality of suction orifices 44 opening downwardly through the hood plate 17a into the space defined by the scraper blade 26 and hood plate 17a. Suction is applied to the manifold 43 from a suction pump (not shown) through hard lines 45, flexible hoses 46 (see FIG. 1) and connectors 47 (see FIGS. 2 and 3) respectively. As best viewed in FIG. 4, accumulated sediment is pushed forwardly (in a right-hand direction in FIG. 1) by the scraper blade 26 in such a manner as to pile up in front of the advancing blade 26. This sediment is continuously sucked away through the orifices 44, manifold 43, connector 47, hose 46 and line 45 to a disposal facility on the discharge side of the suction pump, as the hood 17 and scraper blade 26 move in a sediment collection and removal pass 8.

The hood 17 is horizontally elongated in the direction of travel to afford a canopy helping to contain and prevent dispersal of the sediment piled up by the scraper blade 26, thus assuring that substantially all of the sediment is sucked away to the disposal facility.

FIGS. 7 through 12 illustrate a modified form of sediment collection and removal system. Since many of the elements are the same as those previously described and shown in FIGS. 1–6, the same elements in FIGS. 7–12 are suffixed by a prime.

FIG. 7 shows how a tube settler module 51 may be advantageously incorporated into the channels, for example channel 14' without modification of either the channel or the module. The module 51 is typically rectangular in shape and is mounted at the upper right hand portion of the channel 14', as viewed in FIG. 7. The module 51 comprises a plurality of inclined tubes 52 through which the liquid for clarification is forced to flow upwardly.

As is known to those versed in the current art, tube settlers increase the sedimentation efficiency because they increase the solids settling surface area and reduce the settling distance from the several feet in a conventional clarification basin to 1 to 2 inches inside the tubes. The tubes create laminar flow conditions therein owing to the large wetted perimeter relative to the wetted surface area, thereby affording optimum conditions for sedimentation.

With reference to the particular application illustrated in schematic fashion in FIG. 7, the liquid to be clarified is introduced into the channel 14' through an inlet 53 provided at the upper left-hand portion of the channel 14'. The liquid flows through the channel 14' and is discharged at the upper right-hand portion thereof through an outlet 54. During flow through the channel 14', the liquid is forced to flow upwardly through the tubes 52 of the module 51 in which sedimentation occurs at a greatly increased rate. The general flow path of the liquid is indicated in FIG. 7 by arrows.

Although the liquid flows upwardly through the tubes 52 as shown, the accumulated sediment is urged by gravity to descend through the tubes and fall from the module 51 onto the bottom of the channel 14 where the sediment is removed by the present collection and removal system 16'.

The present system provides an advantage over the type disclosed in U.S. Pat. No. 2,052,676 in which a scraper blade is dragged along the bottom of a sedimentation basin by a carriage which rides on a track on top of the basin. If the prior system were to be incorporated into a basin, provided with tube settlers, the tube settlers would have to be formed with a cutout to accommodate the support members extending from the carriage downwardly to the scraper blade for dragging the blade, thereby increasing the manufacturing cost, decreasing the sedimentation efficiency and providing means for snagging the support members.

As can be seen in FIG. 7, the sediment collection and removal elements of the present invention are disposed below the tube settler module 51, thus making it unnecessary to form cutouts through the module 51.

FIGS. 8 through 12 further illustrate the first modification.

The first modification comprises the addition of buoyancy members 61, here shown as rectangular blocks of a lightweight, solidified, watertight foam material, suitably mounted, as by an adhesive, on the upper surface of the scraper plate 17a'. The effective lighter weight of the modified scraper assembly reduces the friction with the bottom of th basin. In addition, the tendency of the scraper assembly to rotate about a vertical axis in substantially, if not entirely, eliminated. As a consequence, in the preferred embodiment, the skids 18 and 23 and grooves 24 and 25 are omitted. Instead, as best seen in FIGS. 11 and 12, an inverted T-beam 70 which could be of reinforced glass is mounted on the bottom 10' of the basin 11' between the ends 21' and 22' parallel to the sides thereof. The inverted T-beam 70 includes a central ridge 71 which extends upwardly into a conjugate recess 72 defined by two parallel angle members 73 and 74 mounted on the bottom of the hood plate 17a'.

The angle members 73 and 74 extend perpendicular to the hood 17' beyond the forward and after ends thereof. Brackets 75 and 76 are mounted on the ends of the angle members 73 and 74 for attachment to the cable 33'.

Rotation of the hood 17' parallel to the bottom of the basin 11' is prevented by the track formed by the angle members flanges 73 and 74 which provide an elongated configuration serving to hold the ridge 71 in fore and aft alignment.

The modified form simplifies the construction of the scraper body by mounting the operating bar 40', or riser, on the forward vertical surface of the scraper blade 26' at a location between adjacent vertical portions 27b' and 34b' of the scraper support brackets 27' and magnet support brackets 34'.

A magnet support plate 35' (see FIG. 7) transversely spans the respective brackets 27' and 34' above the scraper blade 26' and a magnet 36' is mounted on the bottom of the plate 35' to engage and disengage a ferromagnetic block 37' carried on top of the subjacent scraper blade 26'. The operating bar 40, slides vertically in the channel defined by the depending portions 27b' and 34b'. The top of the bar 40' is beveled, as before, for engagement with the lowering rampe 39'. In the present modification, the lower end of the riser 40' is coplanar with the hard rubber insert 26a' of the scraper blade 26' and the risers 40' are so located as to register with the lifting ramps 38' at the right-hand end 22' of the basin. Thus, the bottom ends of the risers 40' engage the lifting ramps 38' near the end of the sediment collection and removal pass and serve to elevate the scraper blade. By making the risers of low friction material, such as a wear-resistant "Nylon", both the lowering of the blade at the end of the return pass and the lifting of the blade at the conclusion of the collecting and removal pass is smooth.

A second modification is illustrated in FIG. 13 in which double primes are used to designate elements previously disclosed.

In the second modification, the magnet and ferromagnetic block combination is replaced by a spring clip 81 and pin 82 provided with a head 83 capable of prying apart the spring clip arms 84 when moved into engagement therewith and of being retained by the arms 84 until disengaged by a supervening force, such as the downward urgency of the release ramps acting against the riser 40" at the end of the return run. The clip 81 can conveniently be mounted on the bottom of the scraper support bracket 27" and the headed pin 83 on the top of the scraper blade 26". The parts, of course, could be reversed.

It can therefore be seen that I have provided a reliable, economical long-lived and effective system for collecting and removing sediment.

What is claimed is:

1. A sediment collection and removal system for a liquid containing rectangular basin including a bottom, a pair of side walls, a first end and a second end, said system comprising:
   a. a scraper body translatable along said bottom from said first end in a first sediment collecting and removal direction to said second end and from said second end in a second return direction to said first end;
   b. a scraper blade vertically slidably mounted on said scraper body and movable between a lower scraping position in engagement with said bottom and an upper retracted position spaced above said bottom;
   c. retent means carried on said scraper body for holding said scraper blade in said retracted position;
   d. a riser ramp adjacent said second end engageable with said scraper blade to raise said scraper blade from said scraping position to said retracted position; and,
   e. scraper blade lowering means adjacent said first end for moving said scraper blade from said retracted position to said scraping position.

2. A system as in claim 1 in which said scraper blade lowering means comprises a scraper blade lowering ramp engageable with said scraper blade for moving said scraper blade from said retracted position to said scraping position.

3. A system as in claim 1 in which said scraper body and said scraper blade are oriented parallel to said first and said second ends, said scraper body including skids in slidable engagement with said bottom.

4. A system as in claim 3 in which said scraper body includes antirotation beams mounted on the opposite ends thereof, said antirotation beams being oriented perpendicular to said first and said second ends; and rollers carried on said beams engaging said side walls.

5. A system as in claim 3 in which said bottom is formed with longitudinal depressions in which said skids are guidingly received.

6. A system as in claim 1 in which said retent means comprises a magnet and a ferro-magnetic member, said ferro-magnetic member being engageable with said magnet when siad scraper blade is in said retracted position.

7. A system as in claim 6 in which said magnet is a permanent magnet.

8. A system as in claim 6 in which said magnet is an electromagnet.

9. A system as in claim 1 further comprising drive means for reciprocatingly moving said scraper body between said first and said second ends; and reversing means for actuating said drive means to reverse the direction of movement of said scraper body at said first and said second ends.

10. A system as in claim 9 in which said retent means comprises an electromagnet actuated by said reversing means to be energized during movement of said scraper body in said second direction and de-energized during movement of said scraper body in said first direction.

11. A system as in claim 1 further comprising sediment suction means mounted on said scraper body and spaced from said scraper blade in said sediment removal direction of said scraper body.

12. A system as in claim 11 in which said suction means comprises a suction manifold formed with a plurality of suction orifices.

13. A system as in claim 1 further including a buoyancy member mounted on said scraper body so that the submerged combined weight of said scraper body and said buoyancy member is just sufficient to maintain the scraper body in engagement with said bottom of said basin.

14. A system as in claim 1 further including a central ridge extending along the bottom of said basin between said first and second ends, the bottom of said scraper body having an elongated central recess conjugate to said ridge, said ridge being effective to guide said scraper body for movement parallel to said side walls of said basin.

15. A system as in claim 14 further including a pair of basin bottom engaging skids mounted on the opposite ends of said scraper body respectively for preventing rotation of said scraper body about said ridge.

16. A system as in claim 14 in which said ridge includes an angle member fixed to said bottom of said basin and said recess means comprises two angle members mounted in juxtaposed spaced relation on the bottom of said scraper body.

17. A system as in claim 1 in which said retent means comprises a spring clip with opposed arms and a pin provided with a head, said head being engageable with said clip when said scraper blade is in said retracted position.

* * * * *